United States Patent
Wang et al.

(10) Patent No.: US 11,821,637 B2
(45) Date of Patent: Nov. 21, 2023

(54) ENERGY-SAVING SYSTEM USING ELECTRIC HEAT PUMP TO DEEPLY RECOVER FLUE GAS WASTE HEAT FROM HEAT POWER PLANT FOR DISTRICT HEATING

(71) Applicant: DALIAN UNIVERSITY OF TECHNOLOGY, Liaoning (CN)

(72) Inventors: Haichao Wang, Liaoning (CN); Xiaozhou Wu, Liaoning (CN); Ruoyu Zhang, Liaoning (CN); Lin Duanmu, Liaoning (CN); Xiangli Li, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 607 days.

(21) Appl. No.: 17/053,043

(22) PCT Filed: Mar. 25, 2019

(86) PCT No.: PCT/CN2019/079418
§ 371 (c)(1),
(2) Date: Nov. 4, 2020

(87) PCT Pub. No.: WO2020/191564
PCT Pub. Date: Oct. 1, 2020

(65) Prior Publication Data
US 2021/0239326 A1 Aug. 5, 2021

(51) Int. Cl.
*F24D 10/00* (2022.01)
*B01D 53/34* (2006.01)
(Continued)

(52) U.S. Cl.
CPC ......... *F24D 10/006* (2013.01); *B01D 53/343* (2013.01); *B01D 53/502* (2013.01);
(Continued)

(58) Field of Classification Search
CPC .. B01D 53/343; B01D 53/502; B01D 53/504; B01D 53/78; B01D 2251/304;
(Continued)

(56) References Cited

FOREIGN PATENT DOCUMENTS

| CN | 105222203 A | 1/2016 |
|---|---|---|
| CN | 105605647 A | 5/2016 |

(Continued)

OTHER PUBLICATIONS

Office Action and Search Report of the corresponding to Chinese application No. 201910224986.3 dated May 27, 2020. (p. 15).
(Continued)

*Primary Examiner* — Lessanework Seifu
(74) *Attorney, Agent, or Firm* — Muncy, Geissler, Olds & Lowe, P.C.

(57) ABSTRACT

An energy-saving system using electric heat pump to recover flue gas waste heat for district heating uses flue gas waste heat recovery tower to absorb the sensible and latent heat in the high-temperature flue gas by direct contact heat and mass transfer. The circulating water is sprayed from the top and the flue gas flows upwards in the tower. The electric heat pump is indirectly connected with circulating water through the anti-corrosion and high-efficiency water-water plate heat exchanger. The return water of the heat-supply network enters the electric heat pump through the anti-corrosion and high-efficiency water-water plate heat exchanger and exchanges heat indirectly with the high-temperature circulating water. The electric heat pump uses the electric energy of the power plant as the driving power.

8 Claims, 1 Drawing Sheet

(51) Int. Cl.
*B01D 53/50* (2006.01)
*B01D 53/78* (2006.01)
*F24D 3/18* (2006.01)
*F24D 12/02* (2006.01)
*F24D 19/10* (2006.01)
*F28F 25/02* (2006.01)

(52) U.S. Cl.
CPC ........... *B01D 53/504* (2013.01); *B01D 53/78* (2013.01); *F24D 3/18* (2013.01); *F24D 12/02* (2013.01); *F24D 19/10* (2013.01); *F28F 25/02* (2013.01); *B01D 2251/304* (2013.01); *B01D 2251/604* (2013.01)

(58) Field of Classification Search
CPC ...... B01D 2251/604; B01D 2251/0283; F24D 10/006; F24D 3/18; F24D 19/10; Y02B 30/12; Y02B 30/17
See application file for complete search history.

(56) References Cited

FOREIGN PATENT DOCUMENTS

| | | |
|---|---|---|
| CN | 107120714 A | 9/2017 |
| CN | 107178814 A | 9/2017 |
| CN | 107655021 A | 2/2018 |
| CN | 109945277 A | 6/2019 |
| CN | 109945278 A | 6/2019 |
| CN | 109974062 A | 7/2019 |
| RU | 2010135094 A | 2/2016 |

OTHER PUBLICATIONS

Ruoyu Zhang et al., "Technical Approaches to Utilization of Waste Heat from Flue Gas and Circulating Cooling Water in Thermal Power Plants", Gas and Heat, vol. 39 No. 3, p. A01-A05, Mar. 15, 2019. (p. 7).

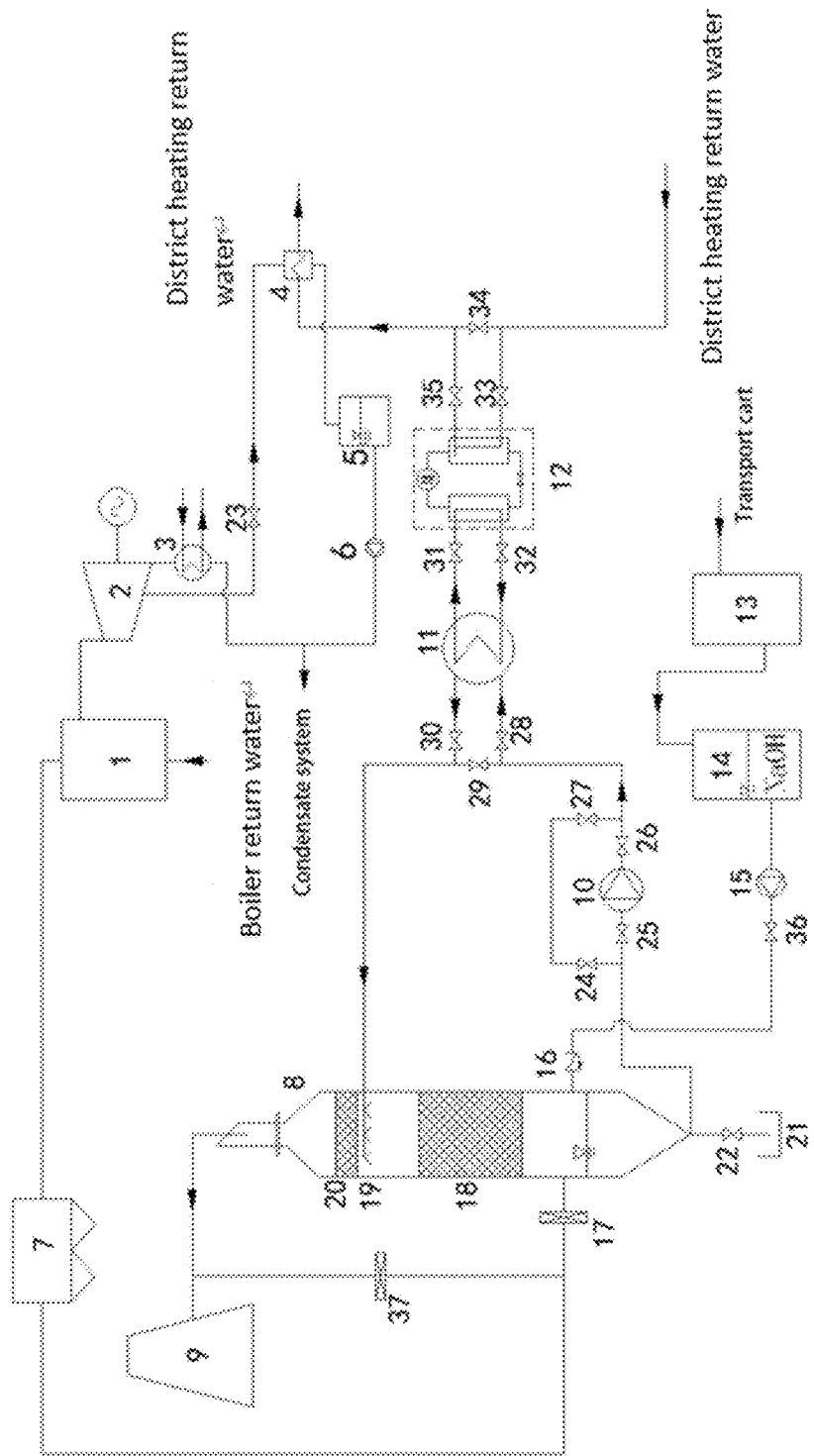

ENERGY-SAVING SYSTEM USING ELECTRIC HEAT PUMP TO DEEPLY RECOVER FLUE GAS WASTE HEAT FROM HEAT POWER PLANT FOR DISTRICT HEATING

BACKGROUND OF THE INVENTION

The invention belongs to the technical field of flue gas purification and flue gas waste heat recovery and utilization for the coal-fired heat power plant, especially relates to a high-efficiency flue gas heat recovery system that uses electric heat pump technology to recover flue gas waste heat for district heating, and also the invention has the function of desulfurization.

BRIEF DISCUSSION OF THE RELATED ART

At the present stage of China's coal-fired heat power plant boiler design, exhaust temperature can reach 130° C.~150° C., waste heat recovery potential is huge. The flue gas waste heat recovery tower with direct contact heat exchanger as the main body can deeply recover the latent heat in the flue gas by spraying cold water to the high temperature flue gas. At the same time, in the heat exchange process, the $SO_2$ and $SO_3$ carried by the flue gas will be dissolved in the spray circulating water, and will be treated by lye, so as to achieve the goal of desulfurization and achieve the effect of absorbing the waste heat of flue gas and the function of desulfurization. It can effectively solve the problem that the waste heat recovery system is often independent of the desulfurization device (e.g. desulfurization tower) and the overall footprint area of the equipment is large. It reduces the investment and operation cost. On the other hand, the cogeneration unit in accordance with the "heat-led electricity generation" strategy will lead to a thermoelectric coupling problem: power generation is surplus when the power demand is low and heat demand is high but the generation is insufficient when the power demand is high and heat demand is low, resulting in the low peak shaving capability of both heat and power. At present, the heat pump heating system, e.g. absorption heat pump unit is usually used in heat power plant, but it consumes relatively low pressure steam and cannot effectively realize the thermo-electric coupling. The application of electric heat pump to the field of waste heat recovery has certain advantages, first, the efficiency of electric heat pump is much higher than the absorption heat pump; Secondly, the recovery effect of the absorption heat pump technology is limited by the extraction parameters of the turbine, while the electric heat pump takes the electric energy as the driving energy, so it is easier to control. Thirdly, the electric heat pump can consume electric energy and has the potential to become a means of peak shaving method in power plants. The electric heat pump can be used to consume the off-peak power, and the waste heat of the flue gas can be used to heat the return water of the heating network, which can increase the peak power of the combined heat and power plant.

In view of the above problems, an energy-saving system using the flue gas waste heat recovery tower combined with the electric heat pump to recover the flue gas heat for district heating is designed. The system can effectively improve the utilization rate of flue gas waste heat in heat power plant, enhance the heating capacity of heat power plant, can achieve a certain degree of peak shaving for both heat and power, and reduce the emission of pollutants.

SUMMARY OF THE INVENTION

The purpose of the invention is to propose an energy-saving system for district heating by using an electric heat pump to deeply recover the flue gas waste heat of a heat power plant and for district heating.

The Technical Solution of the Invention

An energy-saving system using electric heat pump to deeply recover flue gas waste heat from heat power plant for district heating comprises coal-fired boilers 1, steam turbine 2, condenser 3, heat-supply network heat exchanger 4, condensate tank 5, condensate water pump 6, dust remover 7, flue gas waste heat recovery tower 8, stack 9, waste heat recovery solution pump 10, anti-corrosion and high-efficiency water-water plate heat exchanger 11, electric heat pump 12, NaOH storage tank 13, NaOH preparation device 14, NaOH solution pump 15, check valve 16, flue gas inlet valve 17, condensate pool 21, flue gas bypass valve 37, and multiple valves and connecting pipes.

Inner wall of the flue gas waste heat recovery tower 8 is attached with insulation material, consisting mainly of inlet section of the flue gas, filler layer 18, spray layer 19, demister 20 and exhaust outlet section; the inlet section of the flue gas is located in lower section of the flue gas waste heat recovery tower 8, and the exhaust outlet section is located at top of the flue gas waste heat recovery tower 8; the demister 20 is located in upper and interior section of the flue gas waste heat recovery tower 8, and the filler layer 18 is located in middle section and interior of the flue gas waste heat recovery tower 8. The spray layer 19 is located in upper section and interior of the flue gas waste heat recovery tower 8, and the spray layer 19 is located below the demister 20 and above the filler layer 18; high-temperature flue gas produced by the coal-fired boiler 1 is filtered by the dust remover 7, then controlled by the flue gas inlet valve 17, and enters the flue gas waste heat recovery tower 8 through the inlet section of the flue gas, the high-temperature flue gas flows upwards. Circulating water is sprayed at top by the spray nozzle in the spray layer 19. High-temperature flue gas after the filler layer 18 is contacted with spray water, where the intensive direct contact heat and mass transfer occurs between gas and liquid phases. Water vapor in high temperature flue gas will condensate and release heat. Circulating water will absorb high-temperature flue gas heat and drop into bottom of the flue gas waste heat recovery tower 8, one part of the condensate at the bottom of the tower continues to participate in the circulation as circulating water, and another part is controlled by valve located at the bottom of the flue gas waste heat recovery tower 8 and flows into the condensate pool 21 located under the flue gas waste heat recovery tower 8, to recover the flue gas condensate and condensate water. After heat exchange, low-humidity flue gas will be caught by the demister 20, and relatively dry flue gas is discharged from the outlet section of the flue gas and enters the stack 9, to achieve the purpose of recovering waste heat of flue gas condensation.

The NaOH storage tank 13 is connected with the NaOH preparation device 14, lye in the NaOH storage tank 13 enters the NaOH preparation device 14, and desulfurized NaOH solution from the NaOH preparation device 14 will be circulated by the NaOH solution pump 15, and is controlled jointly by valve and the check valve 16, and then, enters the flue gas waste heat recovery tower 8. At the same time, a large amount of $SO_2$ gas in the flue gas has dissolved in condensate of the flue gas waste heat recovery tower 8. The condensate will react with NaOH to achieve the purpose of desulfurization.

The electric heat pump 12 is indirectly connected to the circulating water at the bottom of the flue gas waste heat recovery tower 8 via the anti-corrosion and high-efficiency water-water plate heat exchanger 11. Circulating water is pumped from the bottom of the flue gas waste heat recovery tower 8 by the waste heat recovery solution pump 10 to the anti-corrosion and high-efficiency water-water plate heat exchanger 11, which will exchange heat with the circulating water from the evaporator side of the electric heat pump 12. It will heat the return water from heat-supply network indirectly. Circulating water pipelines have several valves based on demand. After heat exchange process, low-temperature waste heat circulating water will be pumped back to the flue gas waste heat recovery tower 8 and continues to exchange heat with flue gas by spraying. Low-temperature waste heat circulating water pipelines also have several valves based on demand. The return water from district heating network is controlled by valve and flows into the electric heat pump 12, which will be connected indirectly by anti-corrosion and high-efficiency water-water plate heat exchanger 11 and exchange heat with high-temperature waste heat circulating water. Electric heat pump 12 uses electric energy from power plant as driving energy. The return water of the heat-supply network from the electric heat pump 12 enters the heat-supply network heat exchanger 4 for further heating until the water temperature is heated up to the required supply temperature and then the hot water will be sent to the heat-supply network.

The coal-fired boiler 1 is connected with the steam turbine 2. Steam generated by the coal-fired boiler 1 enters the steam turbine 2 for power generation and it is divided into two parts: exhaust steam and extraction steam. The exhaust steam enters the condenser 3. The extraction steam flows into the heat-supply network heat exchanger 4, to heat up the return water of the heat-supply network, and after heat exchange and condensation, it enters the condensation tank 5. The condensed water in the condenser 3 and the condensed water separated from the condensation tank 5 shall be sent to the condensate system for treatment and then returned to the coal-fired boiler 1 for reuse; Condensate water pump 6 is installed at the output pipe of the condensation tank 5.

The circulating water is pumped from the bottom of the flue gas waste heat recovery tower 8 through the waste heat recovery solution pump 10 to the anti-corrosion and high-efficiency water-water plate heat exchanger 11, and the circulating water exchanges heat with the evaporator side of the electric heat pump 12. Circulating water pipelines have several valves based on demand. The valves are arranged in such a way that there are valves at both ends of the waste heat recovery solution pump 10, and a bypass pipeline is set outside the waste heat recovery solution pump 10, and two valves are set on the two ends of the valve at the end of the waste heat recovery solution pump 10. In other words, when the waste heat recovery solution pump 10 is being repaired, close the valves at both ends, and the high-temperature circulating water from the flue gas waste heat recovery tower 8 directly enters the subsequent process through bypass pipeline.

There are a valves between the inlet pipe on the side of the flue gas waste heat recovery tower 8 and the outlet pipe on the side of the flue gas waste heat recovery tower 8 of the anti-corrosion and high-efficiency water-water plate heat exchanger 11. When anti-corrosion and high-efficiency water-water plate heat exchanger 11 is for maintenance, close valve set on the inlet pipe which on the side of the flue gas waste heat recovery tower 8 of the anti-corrosion and high-efficiency water-water plate heat exchanger 11 and valve set on the outlet pipe which is on the side of the flue gas waste heat recovery tower 8, and the high-temperature circulating water from the flue gas waste heat recovery tower 8 goes directly through the valve between the two into the follow-up process.

There is a valve set on the backwater heat-supply network. The backwater is heated by the electric heat pump 12 and fed into the outlet pipe of the heat-supply network heat exchanger 4. There is a valve on the outlet pipe of the heat-supply network heat exchanger 4. Another valve is arranged between the two valves. When the electric heat pump 12 is for maintenance, close the other four valves except the above-mentioned valve arranged between the two valves, and the backwater in heat-supply network goes directly through the other valve into the subsequent process.

Flue gas bypass valve 37 is provided on the pipeline connecting the flue gas outlet section at the top of the flue gas waste heat recovery tower 8 and the section where high-temperature flue gas goes through the flue gas inlet section into the flue gas waste heat recovery tower 8. The flue gas bypass valve 37 is located outside the flue gas inlet valve 17 of the waste heat recovery tower. The flue gas bypass valve 37 is opened when the flue gas waste heat recovery tower 8 fails or is repaired, and the high-temperature flue gas goes directly into the stack 9 and will be discharged into the atmosphere after the dust are removed by dust remover 7.

The effect of the invention: the invention uses an electric heat pump to recover waste heat from the exhaust flue gas for district heating. The exhaust flue gas heat recovery tower and the anti-corrosion and high-efficiency water plate heat exchanger are used to achieve the deep recovery of low temperature flue gas waste heat. In the flue gas waste heat recovery tower, the direct contact heat and mass transfer technology is used to improve the heat recover efficiency, enhance the heat transfer capacity, enable desulfurization, and reduces PM2.5 emissions. The invention uses an electric heat pump to recover flue gas waste heat for district heating, and the high-temperature waste heat circulating water after absorbing the waste heat of the flue gas is indirectly heated by a anti-corrosion and high-efficiency water-water plate heat exchanger and electric heat pump, so as to avoid the corrosion caused by the direct entry of circulating water directly into the heat pump. After heat exchange with the heat network, the circulating return water temperature can be reduced to a minimum of about 25° C., while the flue gas temperature is about 33° C., thereby improving the efficiency of the flue gas waste heat recovery tower. The heat pump system can ensure that the efficient waste heat recovery can be achieved under any operating conditions of the heat network. Combine the flue gas waste heat recovery tower with the electric heat pump, and effectively solve the problems of metal corrosion and cooling source preparation in the field of flue gas heat recovery. In the heating season, the flue gas waste heat is used to heat up the district heating return water, enhance the heating capacity of the heat power plant, while the electric heat pump can consume the excess power of the power plant, improve the thermal power ratio of the heat power plant, enhance the capacity of power peak shaving, achieve a certain degree of heat and power decoupling. It also can provide generating capacity for renewable energies such as wind power and photovoltaic power.

BRIEF DESCRIPTION OF THE DRAWINGS

The sole FIGURE is the schematic of the energy-saving system for the present invention that uses electric heat pump to recover the flue gas waste heat from a heat power plant for district heating.

In the FIGURE: 1 coal-fired boiler; 2 steam turbine; 3 condenser; 4 heat-supply network heat exchanger; 5 condensate tank; 6 condensate water pump; 7 dust remover; 8 flue gas waste heat recovery tower; 9 stack; 10 waste heat recovery solution pump; 11 anti-corrosion and high-efficiency water-water plate heat exchanger; 12 electric heat pump; 13 NaOH storage tank; 14 NaOH preparation device; 15 NaOH solution pump; 16 check valve; 17 flue gas inlet valve; 18 filler layer; 19 spray layer; 20 defog; 21 condensate pool; 22 valve-a; 23 valve-b; 24 valve-c; 25 valve-d; 26 valve-e; 27 valve-f; 28 valve-g; 29 valve-h; 30 valve-i; 31 valve-j; 32 valve-k; 32 valve-l; 33 valve-m; 34 valve-n; 35 valve-o; 36 valve-p; 37 flue gas bypass valve.

DETAILED DESCRIPTION OF THE PREFERRED EMBODIMENTS

In the following, the drawings and technical solutions will further explain the specific implementation of the present invention.

An energy-saving system using electric heat pump to recover flue gas waste heat from heat power plant for district heating is proposed. The system comprises coal-fired boilers 1, steam turbine 2, condenser 3, heat-supply network heat exchanger 4, condensate tank 5, condensate water pump 6, dust remover 7, flue gas waste heat recovery tower 8, stack 9, waste heat recovery solution pump 10, anti-corrosion and high-efficiency water-water plate heat exchanger 11, electric heat pump 12, NaOH storage tank 13, NaOH preparation device 14, NaOH solution pump 15, check valve 16, flue gas inlet valve 17, condensate pool 21, flue gas bypass valve 37, and other valves and connecting pipes.

The inner wall of the flue gas waste heat recovery tower 8 is attached with insulation material, consisting mainly of the inlet section of the flue gas, the filler layer 18, the spray layer 19, the demister 20 and the exhaust outlet section; the inlet section of the flue gas is located in the lower section of the flue gas waste heat recovery tower 8, and the exhaust outlet section is located at the top of the flue gas waste heat recovery tower 8; the demister 20 is located in the upper and interior section of the flue gas waste heat recovery tower 8, and the filler layer 18 is located in the middle section and interior of the flue gas waste heat recovery tower 8. The spray layer 19 is located in the upper section and interior of the flue gas waste heat recovery tower 8, and the spray layer 19 is located below the demister 20 and above the filler layer 18; the high-temperature flue gas produced by the coal-fired boiler 1 is filtered by the dust remover 7, then controlled by the flue gas inlet valve 17, and enters the flue gas waste heat recovery tower 8 through the inlet section of the flue gas, the high-temperature flue gas flows upwards. Circulating water is sprayed at the top by the spray nozzle in the spray layer 19. High-temperature flue gas after the filler layer 18 is contacted with spray water, where the intensive direct contact heat and mass transfer occurs between gas and liquid phases. Water vapor in high temperature flue gas will condensate and release heat. Circulating water will absorb high-temperature flue gas heat and drop into the bottom of the heat recovery tower 8, one part of the condensate at the bottom of the tower continues to participate in the circulation as circulating water, and another part is controlled by valve located at the bottom of the flue gas waste heat recovery tower 8 and flows into the condensate pool 21 located under the flue gas waste heat recovery tower 8, to recover the flue gas condensate and condensate water. After heat exchange, low-humidity flue gas will be caught by the demister 20, and the relatively dry flue gas is discharged from the outlet section of the flue gas and enters the stack 9, to achieve the purpose of recovering waste heat of flue gas condensation.

The NaOH storage tank 13 is connected with the NaOH preparation device 14, the lye in the NaOH storage tank 13 enters the NaOH preparation device 14, and the desulfurized NaOH solution from the NaOH preparation device 14 will be circulated by the NaOH solution pump 15, and is controlled jointly by the valve-p 36 and the check valve 16, and then, enters the flue gas waste heat recovery tower 8. At the same time, a large amount of $SO_2$ gas in the flue gas has dissolved in condensate of the flue gas waste heat recovery tower 8. The condensate will react with NaOH to achieve the purpose of desulfurization.

The electric heat pump 12 is indirectly connected by anti-corrosion and high-efficiency water-water plate heat exchanger 11 to the circulating water at the bottom of the flue gas waste heat recovery tower 8. Circulating water is sent from the bottom of the flue gas waste heat recovery tower 8 by the waste heat recovery solution pump 10 to the anti-corrosion and high-efficiency water-water plate heat exchanger 11 through the valve-d 25, valve-e 26 and valve-g 28, the circulating water will exchange heat with the circulating water from the evaporator side of the electric heat pump 12. It will heat the backwater from heat-supply network indirectly. After heat exchange process, low-temperature waste heat circulating water will be back to the flue gas waste heat recovery tower 8 through valve-i 30 and continues to exchange heat with flue gas by spraying. The return water from district heating network is controlled by valve-m 33 and flows into the electric heat pump 12, which will be connected indirectly by anti-corrosion and high-efficiency water-water plate heat exchanger 11 and exchange heat with high-temperature waste heat circulating water. Electric heat pump 12 uses electric energy from power plant as driving energy; the return water of the heat-supply network from the electric heat pump 12 enters the heat-supply network heat exchanger 4 for further heating until the water temperature is heated up to the required supply temperature and then the hot water will be sent to the heat-supply network.

The steam generated by the coal-fired boiler 1 enters the steam turbine 2 for power generation and it is divided into two parts: exhaust steam and extraction steam. The exhaust steam enters the condenser 3. The extraction steam flows into the heat-supply network heat exchanger 4, to heat up the return water of the heat-supply network, and after heat exchange and condensation, it enters the condensation tank 5. The condensed water in the condenser 3 and the condensed water separated from the condensation tank 5 shall be sent to the condensate system for treatment and then returned to the coal-fired boiler 1 for reuse; condensate water pump 6 is installed at the output pipe of the condensation tank 5.

Flue gas bypass valve 37 is provided on the pipeline connecting the flue gas outlet section at the top of the flue gas waste heat recovery tower 8 and the section where high-temperature flue gas goes through the flue gas inlet section into the flue gas waste heat recovery tower 8. The flue gas bypass valve 37 is located outside the flue gas inlet valve 17 of the flue gas waste heat recovery tower. The flue gas bypass valve 37 is opened when the flue gas waste heat recovery tower 8 fails or is repaired, and the high-temperature flue gas goes directly into the stack 9 and will be discharged into the atmosphere after the dust are removed by dust remover.

The circulating water pipes in the road are set multiple valves based on demand. The valve is arranged in such a way that there are valve-d 25 and valve-e 26 at both ends of the waste heat recovery solution pump 10, and a bypass pipeline is set outside the waste heat recovery solution pump 10, and valve-c 24 and valve-f 27 are set on the two ends of the valve-d 25 and valve-e 26. When the waste heat recovery solution pump 10 is being repaired, close the valve-d 25 and valve-e 26 at both ends, and the high-temperature circulating water from the flue gas waste heat recovery tower 8 of flue gas directly enters the subsequent process through bypass pipeline.

There are valve-g 28, valve-h 29 and valve-i 30 between the inlet pipe on the side of the flue gas waste heat recovery tower 8 and the outlet pipe on the side of the flue gas waste heat recovery tower 8 of the anti-corrosion and high-efficiency water-water plate heat exchanger 11. When anti-corrosion and high-efficiency water-water plate heat exchanger 11 is for maintenance, close the valve-g 28 and valve-i 30 and the high-temperature circulating water from the flue gas waste heat recovery tower 8 goes directly through the valve between the two into the follow-up process.

There is a valve-m 33 set on the inlet pipe of the backwater heat-supply network. The backwater is heated by the electric heat pump 12 and fed into the outlet pipe of the heat-supply network heat exchanger 4. There is a valve-o 35 on the outlet pipe. Valve-n 34 is arranged between the two valves. Valve-j 31 and valve-k 32 are provided on the inlet and outlet pipelines that connect electric heat pump 12 and the anti-corrosion and high-efficiency water-water plate heat exchanger 11. When the electric heat pump 12 is for maintenance, close the valve-j 31, valve-k 32, valve-m 33 and valve-o 35, the backwater in heat-supply network goes directly through valve-n 34 into the subsequent process.

In the heating season, assume that the return water temperature of district heating network is $T_h$, the circulating water temperature at the outlet of the flue gas waste heat recovery tower 8 is $T_{tc}$. The anti-corrosion and high-efficiency water-water plate heat exchanger 11 and electric heat pump 12 are connected in series to recover the flue gas waste heat. The return water of the heat-supply network goes directly into electric pump 12, where heat was transferred indirectly from the heat exchanger to the heat pump and then to the return water. This process will heat up the district heating return water by a temperature increase of $\Delta T_1$. The electric heat pump 12 consumes the electricity generated by the heat plant as the driving power. At this point, if the temperature of heat-supply network return water $(T_h+\Delta T_1)$ is higher than the water supply temperature $(T_g)$ which meets the operation requirements, i.e. $(T_h+\Delta T_1) \geq T_g$, then close valve-b23 and open valve-o35, and the heat of the central heating system is completely supplied by the waste heat of the flue gas without heat-supply network heat exchanger 4. If the return water temperature of the heat-supply network does not reach the water supply temperature after the heat pump 12, i.e. $(T_h+\Delta T_1)<T_g$, then open the valve-b23 and valve-o35 and pump the return water of the heat-supply network to the heat-supply network heat exchanger 4 for further heating, but heat supply from the heat exchanger only needs to allow the temperature rise of $T_g-(T_h+\Delta T_1)$, which greatly reduces the steam extraction for the heat-supply network heat exchanger 4 and achieves energy saving.

The above is only the preferred configuration of the present invention and is not used to restrict the present invention. It should be noted that, for ordinary technicians in the technical field, some improvements and variations based on this invention are also regarded as the protection scope of the present invention.

The invention claimed is:

1. An energy-saving system using electric heat pump to recover the waste heat from coal-fired exhaust flue gas for district heating, comprising coal-fired boilers, steam turbine, condenser, heat-supply network heat exchanger, condensate tank, condensate water pump, dust remover, flue gas waste heat recovery tower, stack, waste heat recovery solution pump, anti-corrosion and high-efficiency water-water plate heat exchanger, electric heat pump, NaOH storage tank, NaOH preparation device, NaOH solution pump, check valve, flue gas inlet valve, condensate pool, flue gas bypass valve, and multiple valves and connecting pipes;

inner wall of the flue gas waste heat recovery tower is attached with insulation material; the flue gas waste heat recovery tower mainly consists of inlet section of the flue gas, filler layer, spray layer, demister and exhaust outlet section; the inlet section of the flue gas is located in lower section of the flue gas waste heat recovery tower, and the exhaust outlet section is located at top of the flue gas waste heat recovery tower; the demister is located in upper and interior section of the flue gas waste heat recovery tower, and the filler layer is located in middle section and interior of the flue gas waste heat recovery tower; the spray layer is located in upper section and interior of the flue gas waste heat recovery tower, and the spray layer is located below the demister and above the filler layer; high-temperature flue gas produced by the coal-fired boiler is filtered by the dust remover, then controlled by the flue gas inlet valve, and enters the flue gas waste heat recovery tower through the inlet section of the flue gas waste heat recovery tower, the high-temperature flue gas flows upwards in the tower; circulating water is sprayed at top by the spray nozzle in the spray layer; high-temperature flue gas after the filler layer is contacted with spray water, where the intensive direct contact heat and mass transfer occurs between gas and liquid phases; water vapor in high temperature flue gas will condensate and release heat; circulating water will absorb heat from high-temperature flue gas and drop into the bottom of the flue gas waste heat recovery tower, one part of the condensate that returned to the bottom of the tower continues to participate in the circulation as circulating water, and another part is controlled by valve located at the bottom of the flue gas waste heat recovery tower and flows into the condensate pool located under the flue gas waste heat recovery tower, to recover the flue gas condensate and condensing water; after heat exchange, the moisture in the low-humidity flue gas will be caught by the demister, and the relatively dry flue gas is discharged from the outlet section of the flue gas and enters the stack, to achieve the purpose of recovering waste heat of flue gas condensation;

the NaOH storage tank is connected with the NaOH preparation device, lye in the NaOH storage tank enters the NaOH preparation device, and desulfurized NaOH solution from the NaOH preparation device will be circulated by the NaOH solution pump, and is controlled jointly by valve and the check valve, and then, enters the flue gas waste heat recovery tower; at the same time, a large amount of $SO_2$ gas in the flue gas has dissolved in condensate of the flue gas waste heat recovery tower; the condensate will react with NaOH to achieve the purpose of desulfurization;

the electric heat pump is indirectly connected by anti-corrosion and high-efficiency water-water plate heat exchanger to the circulating water at the bottom of the flue gas waste heat recovery tower; circulating water is sent from the bottom of the flue gas waste heat recovery tower by the waste heat recovery solution pump or without the waste heat recovery solution pump to the anti-corrosion and high-efficiency water-water plate heat exchanger, which will exchange heat with the circulating water from the evaporator side of the electric heat pump; the circulating water heats up return water from heat-supply network; circulating water pipelines have several valves based on demand; after heat exchange process, low-temperature waste heat circulating water will be pumped back to the flue gas waste heat recovery tower and continues to exchange heat with flue gas by spraying; low-temperature waste heat circulating water pipelines also have several valves based on demand; return water from district heating network is controlled by valve and flows into the electric heat pump, which will be connected indirectly by anti-corrosion and high-efficiency water-water plate heat exchanger and exchange heat with high-temperature waste heat circulating water; electric heat pump uses electric energy from power plant as driving energy; the return water of the heat-supply network from the electric heat pump enters the heat-supply network heat exchanger for further heating until the water temperature is heated up to the required supply temperature and then the hot water will be sent to the heat-supply network;

the coal-fired boiler is connected with the steam turbine; the steam generated by a coal-fired boiler enters the steam turbine for power generation and it is divided into two parts: exhaust steam and extraction steam; the exhaust steam enters the condenser; the extraction steam flows into the heat-supply network heat exchanger, to heat up the return water of the heat-supply network, and after heat exchange and condensation, it enters the condensation tank; the condensed water in the condenser and the condensed water separated from the condensation tank will be sent to a condensate system for treatment and then returned to the coal-fired boiler for reuse; condensate water pump is installed at the output pipe of the condensation tank.

2. The energy-saving system using electric heat pump to recover the waste heat from coal-fired exhaust flue gas for district heating according to claim 1, wherein circulating water pipes have several valve based on demand, the valves are arranged in such a way that there are valves at both ends of the waste heat recovery solution pump, and a bypass pipeline is set outside the waste heat recovery solution pump, and two valves are set on two ends of valve at the end of the waste heat recovery solution pump; when the waste heat recovery solution pump is being repaired, close the valves at both ends, and the high-temperature circulating water from the flue gas waste heat recovery tower directly enters the subsequent process through bypass pipeline.

3. The energy-saving system using electric heat pump to recover the waste heat from coal-fired exhaust flue gas for district heating according to claim 1, wherein there are valves between an inlet pipe on the side of the flue gas waste heat recovery tower and an outlet pipe on the side of the flue gas waste heat recovery tower of the anti-corrosion and high-efficiency water-water plate heat exchanger; when anti-corrosion and high-efficiency water-water plate heat exchanger is for maintenance, close valve set on the inlet pipe which on the side of the flue gas waste heat recovery tower of the anti-corrosion and high-efficiency water-water plate heat exchanger and valve set on the outlet pipe which is on the side of the flue gas waste heat recovery tower, and the high-temperature circulating water from the flue gas waste heat recovery tower goes directly through the valves between the inlet pipe on the side of the flue gas waste heat recovery tower and the outlet pipe on the side of the flue gas waste heat recovery tower of the anti-corrosion and high-efficiency water-water plate heat exchanger into the follow-up process.

4. The energy-saving system using electric heat pump to recover the waste heat from coal-fired exhaust flue gas for district heating according to claim 1, wherein there is a valve set on an inlet pipe of backwater heat-supply network; backwater is heated by the electric heat pump and fed into an outlet pipe of the heat-supply network heat exchanger; there is a valve on the outlet pipe of the heat-supply network heat exchanger; another valve is arranged between the two valves; when the electric heat pump is for maintenance, close other four valves except the above-mentioned valve arranged between the two valves, and the backwater in heat-supply network goes directly through the other valve into the subsequent process.

5. The energy-saving system using electric heat pump to recover the waste heat from coal-fired exhaust flue gas for district heating according to claim 3, wherein there is a valve set on inlet pipe of backwater heat-supply network; backwater is heated by the electric heat pump and fed into outlet pipe of the heat-supply network heat exchanger; there is a valve on the outlet pipe of the heat-supply network heat exchanger; another valve is arranged between the two valves; when the electric heat pump is for maintenance, close other four valves except the above-mentioned valve arranged between the two valves, and the backwater in heat-supply network goes directly through the other valve into the subsequent process.

6. The energy-saving system using electric heat pump to recover the waste heat from coal-fired exhaust flue gas for district heating according to claim 1, wherein flue gas bypass pipe valve is provided on a pipe road where the high-temperature flue gas enters the flue gas waste heat recovery tower through the flue gas inlet section; the flue gas bypass pipe valve is located outside the flue gas inlet valve of the flue gas waste heat recovery tower; the flue gas bypass pipe valve is opened when the flue gas waste heat recovery tower fails or is repaired, and the high-temperature flue gas goes directly into the stack and will be discharged into the atmosphere after the dust are removed by dust remover.

7. The energy-saving system using electric heat pump to recover the waste heat from coal-fired exhaust flue gas for district heating according to claim 3, wherein flue gas bypass pipe valve is provided on the pipeline connecting the flue gas outlet section at the top of the flue gas waste heat recovery tower and the section where high-temperature flue gas goes through the flue gas inlet section into the flue gas waste heat recovery tower; the flue gas bypass pipe valve is located outside the flue gas inlet valve of the flue gas waste heat recovery tower; the flue gas bypass pipe valve is opened when the flue gas waste heat recovery tower fails or is repaired, and the high-temperature flue gas goes directly into the stack and will be discharged into the atmosphere after the dust are removed by dust remover.

8. The energy-saving system using electric heat pump to recover the waste heat from coal-fired exhaust flue gas for district heating according to claim 4, wherein flue gas bypass pipe valve is provided on the pipeline connecting the flue gas outlet section at the top of the flue gas waste heat recovery tower and the section where high-temperature flue gas goes through the flue gas inlet section into the flue gas waste heat recovery tower; the flue gas bypass pipe valve is located outside the flue gas inlet valve of the flue gas waste heat recovery tower; the flue gas bypass pipe valve is opened when the flue gas waste heat recovery tower fails or is repaired, and the high-temperature flue gas goes directly into the stack and will be discharged into the atmosphere after the dust are removed by dust remover.

\* \* \* \* \*